US008695946B2

(12) United States Patent
Lynch

(10) Patent No.: US 8,695,946 B2
(45) Date of Patent: Apr. 15, 2014

(54) REPLACEABLE SUSPENSION ASSEMBLY AND METHOD OF ATTACHMENT

(75) Inventor: James E. Lynch, Corning, NY (US)

(73) Assignee: Mirion Technologies (IST) Corporation, Horseheads, NY (US)

( * ) Notice: Subject to any disclaimer, the term of this patent is extended or adjusted under 35 U.S.C. 154(b) by 554 days.

(21) Appl. No.: 12/999,613

(22) PCT Filed: Jul. 28, 2009

(86) PCT No.: PCT/US2009/052002
§ 371 (c)(1),
(2), (4) Date: Dec. 16, 2010

(87) PCT Pub. No.: WO2010/014638
PCT Pub. Date: Feb. 4, 2010

(65) Prior Publication Data
US 2011/0095148 A1    Apr. 28, 2011

Related U.S. Application Data

(60) Provisional application No. 61/084,993, filed on Jul. 30, 2008.

(51) Int. Cl.
*B66D 3/08* (2006.01)
*B66D 3/06* (2006.01)
*B66D 3/04* (2006.01)

(52) U.S. Cl.
USPC ............ 254/397; 254/394; 254/409; 254/401

(58) Field of Classification Search
USPC ......... 254/410, 409, 405, 402, 401, 398, 397, 254/395, 394, 393, 392; 269/900, 55, 24, 269/32; 29/892, 892.1; 248/125.2, 332; 294/210, 410, 409
See application file for complete search history.

(56) References Cited

U.S. PATENT DOCUMENTS

| 2,060,174 | A | * | 11/1936 | Campbell | 254/405 |
| 2,633,329 | A | * | 3/1953 | Le Bus | 254/406 |
| 4,716,010 | A |   | 12/1987 | Gallo | 376/260 |
| 4,952,072 | A | * | 8/1990 | Ellingson et al. | 376/261 |
| 5,472,254 | A | * | 12/1995 | Wander | 294/82.35 |
| 5,593,116 | A | * | 1/1997 | Pettesch et al. | 248/75 |
| 6,591,716 | B2 | * | 7/2003 | Wantz | 81/53.1 |

FOREIGN PATENT DOCUMENTS

| EP | 0 263 337 A2 | 4/1988 |
| EP | 0 295 451 A2 | 12/1988 |

* cited by examiner

*Primary Examiner* — Emmanuel M Marcelo
*Assistant Examiner* — Justin Stefanon
(74) *Attorney, Agent, or Firm* — Ladas & Parry, LLP

(57) ABSTRACT

An apparatus comprising a receptacle defining therethrough a central bore and a pair of opposed slots extending from the central bore. The apparatus has a support surface surrounding in part the central bore and slots. The appartus further has a stud assembly comprising a stud and an engagement pin extending orthogonally to the stud. The stud is removably inserted into the central bore and raised such that the pin passes through the slots. The stud is then rotated such that the pin rests on the support surface. The apparatus also has a pulley assembly attached to the stud assembly.

19 Claims, 18 Drawing Sheets

REPLACEABLE SUSPENSION ASSEMBLY AND METHOD OF ATTACHMENT

CROSS-REFERENCE TO RELATED APPLICATIONS:

This application is the U.S. National Stage of International Patent Application No. PCT/US2009/052002 filed on Jul. 28, 2009 which claims priority to U.S. Provisional Application 61/084,993 filed on Jul. 30, 2008 the disclosures of which are hereby incorporated by reference in their entirety.

BACKGROUND

1. Field

The here disclosed technology pertains generally to pulley assemblies, and more particularly to the mounting of pulley assemblies to allow repair, replacement and re-stringing where there is limited access to the pulley assembly mounting area, most particularly within tubular structures. More broadly, the present technology pertains to a replaceable suspension assembly and the method of attachment.

2. Description of Related Art

Nuclear power plants have ex-core instruments that are installed in long vertical pipes or tubes, commonly referred to as instrumentation wells. In some cases, the top areas of these instrument pipes are not accessible after the plant has been constructed, e.g. because of physical obstructions or radiological issues (very high radiation, even during reactor outages. These are considered inverted wells and the instruments must be inserted and removed from the well bottom. It is desired, and required practically, to have a suspension (pulley) assembly within these inverted instrumentation wells to facilitate installing (lifting) and removing (lowering) the instruments. In some cases the pulley assembly is used only for installing and removing a detector assembly. Once the detector assembly is installed, its entire weight is supported from the bottom of the well. The pulley assembly should still be able to support the detector assembly and act as a backup or redundant support. In other cases, the pulley cable would solely be used to support an instrument package, i.e. there would be no bottom support. Since the suspension system will be periodically used over the power plant life, 40 years and beyond, it must be serviceable.

Although inverted wells have been used in the past, there has been access (during reactor outages) to the pulley systems mounted at their tops. However, some new reactors will use "bottom inserted" ex-core instruments (detector assemblies) and their design does not permit access to the top area of the instrumentation wells. This is problematic if they install the current style pulley system since they would have to work flawlessly for 60 years. They would not be able to repair the pulley systems, and of even greater concern they would not be able to re-string a broken lift movement or suspension wire rope onto a pulley system. Also existing reactors that have been modified may no longer permit top access and require bottom access. In other cases top access may just be too inconvenient, e.g. where a "man-lift" is not easily available.

These inverted wells are typically formed of 6 to 8 inch diameter schedule 40 or 80 steel pipe and typically have a height in excess of 10 feet. It would be impractical to replace a broken lift or suspension stainless steel wire rope by pushing a "fish" or wire up from the bottom of the well and threading it through a pulley at the top of the well. To re-string such a rope will generally require some access to the pulley.

Instruments deployed in the inverted wells are generally supported by a bottom plate secured to a flange formed around and extending out from the bottom of the pipe. However, in some new reactors, the pipes are mounted right up against structural walls, making a complete bottom flange and bottom support plate difficult to accomodate.

There are typically 12 ex-core detector instrument wells around the reactor, each containing a detector assembly weighing in excess of a hundred pounds. Various ex-core instruments must be operating during reactor operation, during shutdown, and post accident. Certain limited failures are permissible during operation, but typically all ex-core instruments must be fully functional prior to restarting the reactor after periodic outages, e.g. every 18 months, or after shutdown for any other reason. Therefore, any delay caused by difficulties in replacing an instrument will result in a costly extended shutdown of the reactor.

In addition to the ex-core detector instrument wells, there may also be other instrument wells for other types of deployable instruments, e.g. environmental passive dosimeters and temperature detectors that are exchanged during outages. In cases where strength is not required, low activation material, such as aluminum, would be used for the cable.

Besides nuclear reactors, there may be other situations where it is necessary to deploy a string of instruments or other devices in inverted wells where the instruments or devices are suspended from a pulley system at the top of the well and where access to the top of the well is limited after installation of the well tube has been completed.

Accordingly it is desirable to provide an improved method and apparatus for mounting pulley assemblies at the top of instrument wells where access to the top of the wells is limited. It is also desirable to deploy a string of detector instruments in an inverted instrument well by suspending the instruments from a pulley system attached to the top of the well where access to the pulley system is only from the bottom of the well. It is also desirable to provide a bottom support for the installed instruments where there is no bottom flange on the well.

BRIEF SUMMARY

An aspect of the technology here disclosed is an apparatus, including a receptacle defining therethrough a central bore and a pair of opposed slots extending from the central bore, and having a support surface surrounding in part the central bore and slots; a stud assembly having a stud and an engagement pin extending orthogonally to the stud, wherein the stud is removably inserted into the central bore and raised such that the pin passes through said slots, and further wherein the stud is then rotated such that the pin rests on the support surface; and a pulley assembly attached to the stud assembly. The support surface preferably includes grooves or depressions in which the pin rests.

Another aspect of the present technology is an inverted well system, including a well pipe; a receptacle mounted at the top of the well pipe and defining therethrough a central bore and a pair of opposed slots extending from the central bore, and having a support surface surrounding in part the central bore and slots; a stud assembly comprising a stud and an engagement pin extending orthogonally to the stud, wherein the stud is removably inserted into the central bore and raised such that the pin passes through said slots, and further wherein the stud is then rotated such that the pin rests on the support surface; and a pulley assembly attached to the stud assembly, the pulley assembly being sized to substantially the well pipe diameter. A securing base that fits into the bottom of the well pipe and is releaseably secured thereto, and that supports an instrument package may be included.

A further aspect of the present technology is a method of removeably mounting a pulley assembly from the bottom in an inverted well where there is limited access to the top of the well, by mounting a receptacle at the top of the well during construction thereof, the receptacle defining therethrough a central bore and a pair of opposed slots extending from the central bore, and having a support surface surrounding in part the central bore and slots; providing a stud assembly having a stud and an engagement pin extending orthogonally to the stud, with the pulley assembly attached to the stud assembly, the pulley assembly being sized to substantially the well pipe inner diameter; engaging the bottom of the pulley assembly with a lifting tool; to install the pulley assembly at the top of the well, lifting the tool so that the stud is removably inserted into the central bore and raised such that the pin passes through the slots, and then rotating the tool so that the stud is then rotated such that the pin rests on the support surface; to remove the pulley assembly from the top of the well, lifting the tool so that the pin is raised from the support surface, then rotating the tool so that the pin is positioned over the slots, then lowering the tool so that the stud slides down the central bore and the pin passes down through the slots.

Further aspects of the here described technology will be brought out in the following portions of the specification, wherein the detailed description is for the purpose of fully disclosing preferred embodiments of the technology without placing limitations thereon.

BRIEF DESCRIPTION OF THE DRAWINGS

The present technology will be more fully understood by reference to the following drawings which are for illustrative purposes only.

DETAILED DESCRIPTION

Referring more specifically to the drawings, for illustrative purposes the present technology is embodied in the apparatus generally shown in FIG. 1A through FIG. 8. It will be appreciated that the apparatus may vary as to configuration and as to details of the parts, without departing from the basic concepts as disclosed herein.

The present technology is a method and apparatus to mount a pulley system at the top of an inverted well, i.e. a well where there is no access or limited access to the pulley system mounting area at the top of the well after construction, so that all further access must be or is more practical from the bottom of the well. The present technology includes a receptacle mounted at the top of the well and a removable pulley assembly that can be installed in, removed from and re-installed in the receptacle from the bottom of the well.

Figure 1A:
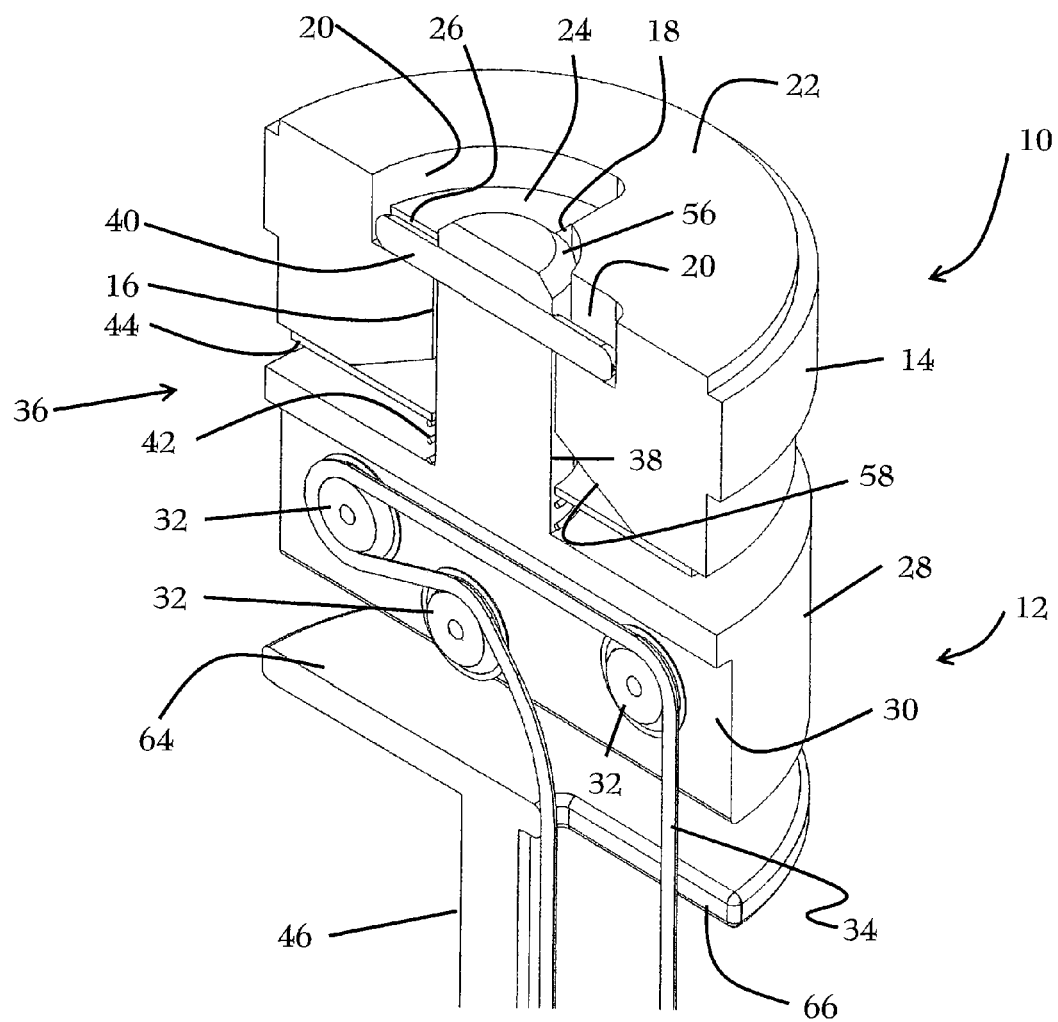
FIGS. 1A, B are a perspective view partly in section and an assembly drawing of a receptacle and pulley assembly of the present technology.
Figure 2A:
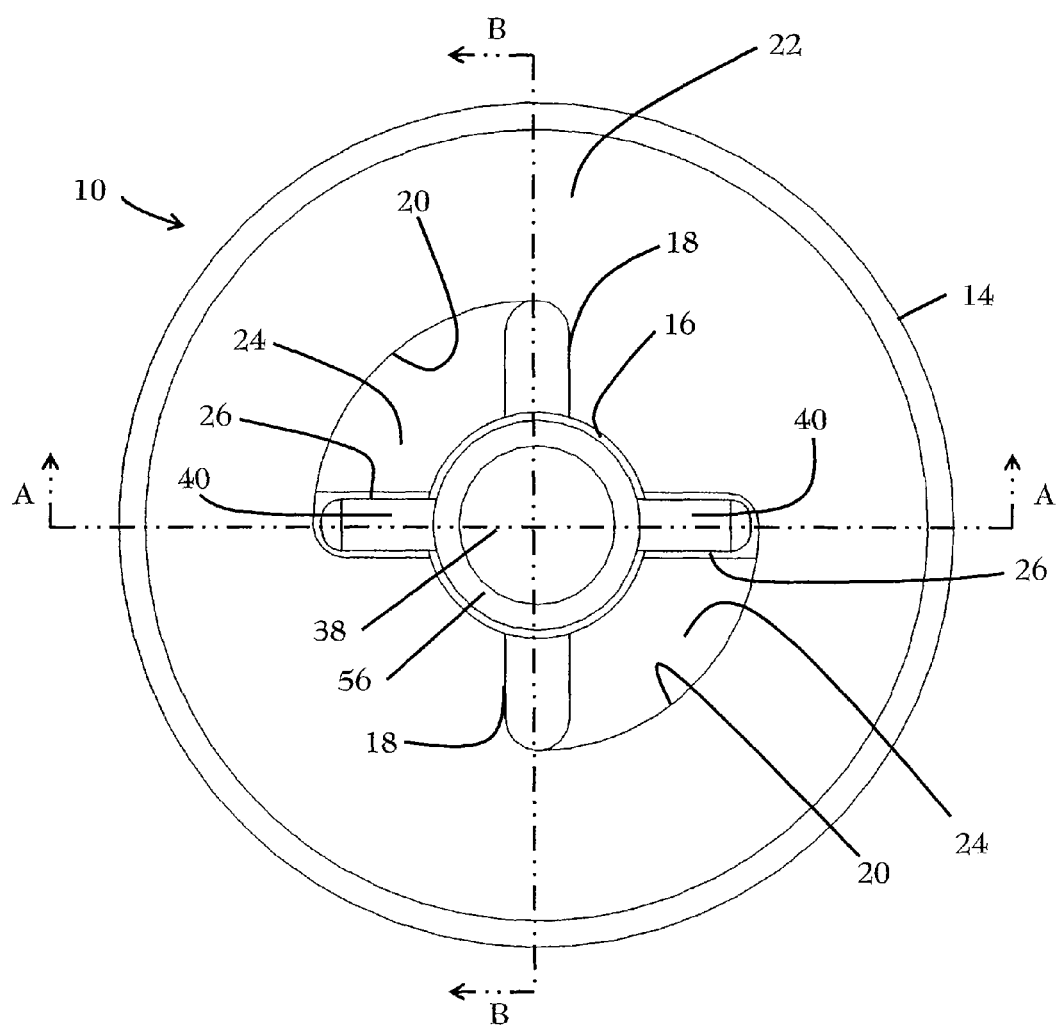
FIG. 2A is a top view of a receptacle of the present technology with a pulley assembly attached.
Figure 2B:
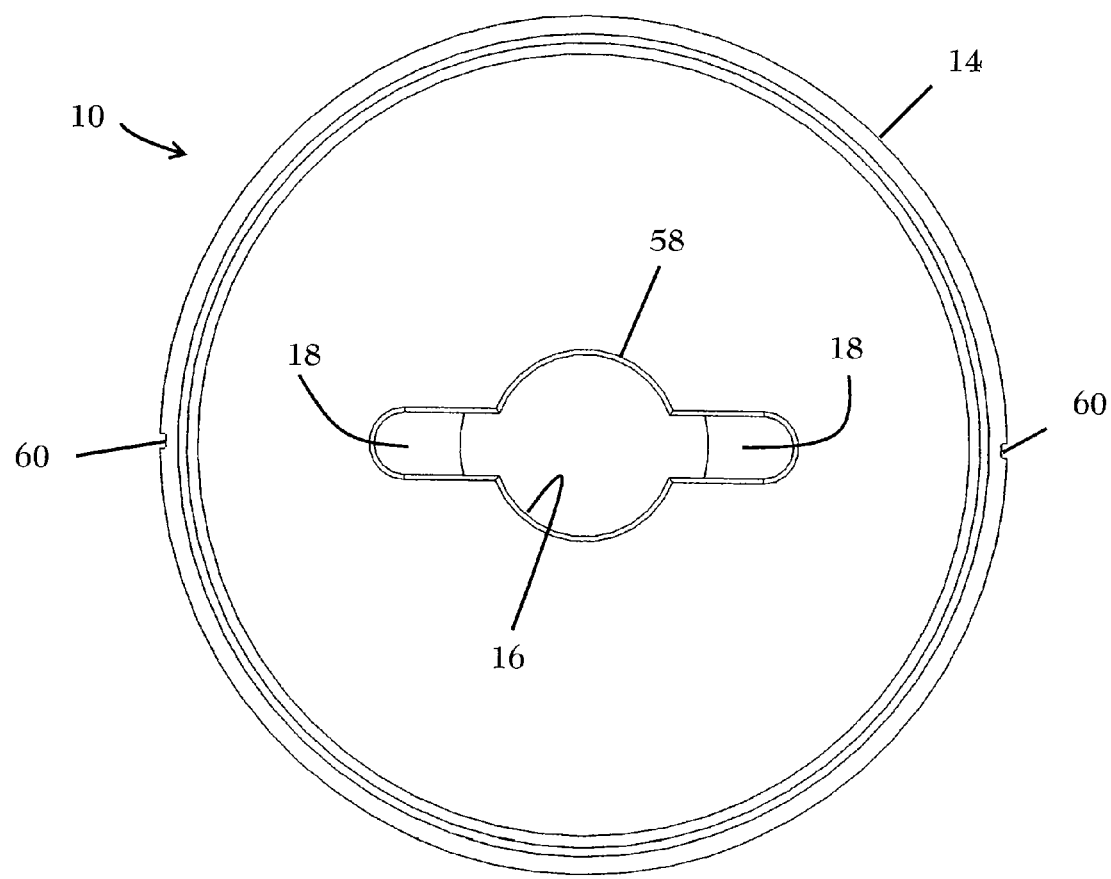
FIG. 2B is a bottom view of a receptacle of the present technology.

FIG. 1A shows a receptacle 10 that is installable at the top of an inverted well, and a pulley assembly 12 that removably attaches to the receptacle 10. FIGS. 2A, B show the receptacle 10 from the top and bottom. Receptacle 10 is formed of a substantially disc shaped (cylindrical) body 14 having a central bore 16 therethrough and a pair of opposed slots or channels 18 extending out from central bore 16 and also passing through body 14. A pair of quadrant recesses 20 are formed around central bore 16 in opposed quadrants on the top 22 of receptacle body 14. A slot 18 is on one side of each recess 20, i.e. a slot 18 extends up through body 14 to a recess 20 and is positioned on one side thereof. Each recess 20 has a bottom surface 24 and a groove or recess 26 formed in bottom surface 24. The grooves 26 are on opposite sides of the recesses 20 from the slots 18, i.e. grooves 26 are at right angles to slots 18 because the recesses 20 are quadrants. However, grooves 26 and slots 18 may be at other angles if a different sized or shaped recess 20 is formed, but are at opposed sides of the recess 20.

Figure 3A:
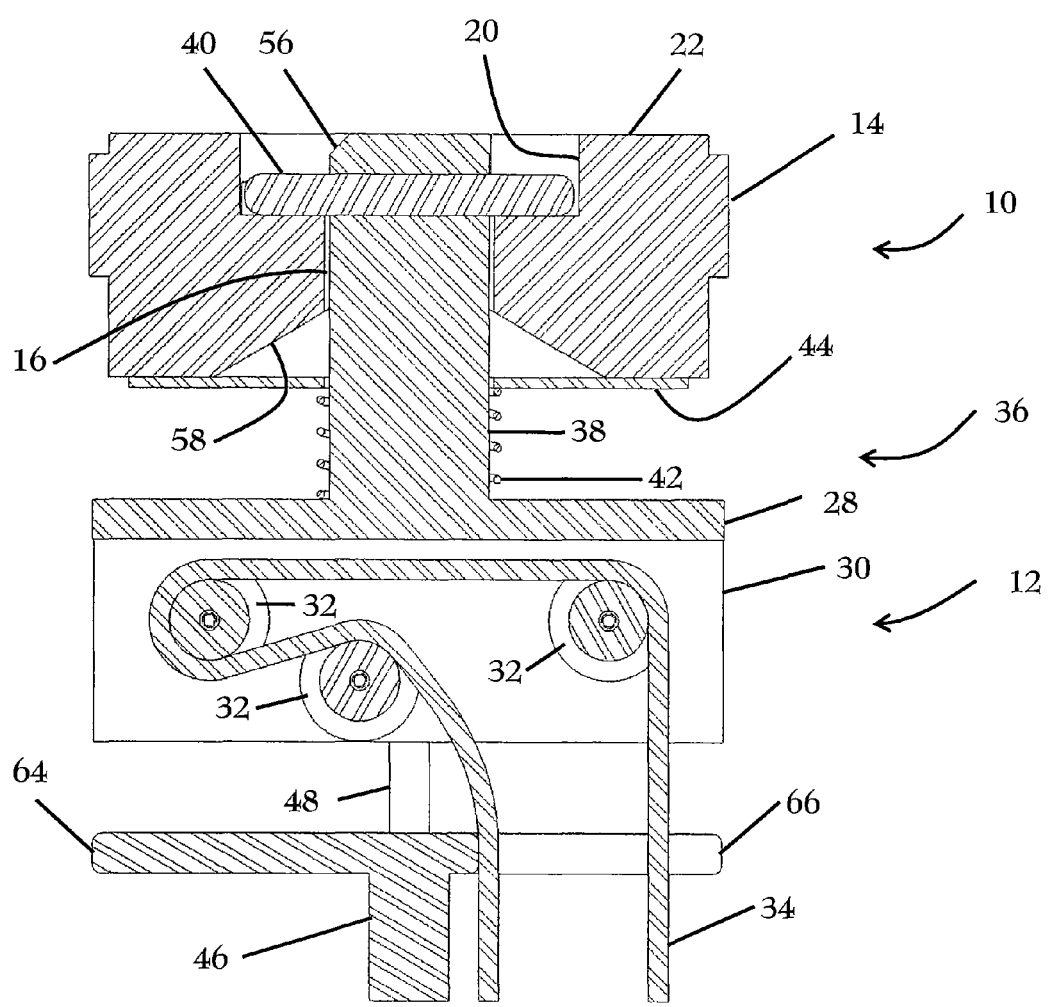
FIGS. 3A, B are side views along lines A-A and B-B in FIG. 2A of a receptacle and pulley assembly of the present technology.

Pulley assembly 12, as shown in FIGS. 1A, 3A, B, is formed of a substantially disc shaped (cylindrical) body 28 having a slot 30 extending up from the bottom surface of body 28. Pulleys 32 are rotatably mounted to body 28 in slot 30 and a rope or cable 34 passes over pulleys 32 and extends down from pulley assembly 12. While three pulleys 32 are shown, one or more pulleys can be used. Pulleys 32 are positioned so one end of cable 34 extends down from substantially the outside diameter of assembly 12 (along the edge of the well) and the other end extends down from the center of assembly 12 (down the center of the well). Cable 34 is typically a stranded stainless steel wire rope, and can be electrically insulated from the instrument package by a ceramic coupling at the end of the cable.

Pulley assembly 12 is attached to a stud assembly 36 that is formed of a cylindrical member (stud) 38. An engagement pin or other support member 40 extends through and out from cylindrical member 38 near its top end, and is fixedly attached thereto. The pulley assembly 12 and stud assembly 36 may be formed as an integral part as shown or they may be formed as two separate parts and attached together. The combined pulley and stud assemblies may be referred to as the pulley/stud assembly. A spring 42 is preferably wound around cylindrical member 38. An optional plate 44 can be positioned above spring 42, i.e. spring 42 can be attached to the bottom of plate 44 for better contact with the bottom of receptacle 10 to facilitate spring force transfer thereto.

The engagement pin may be hardened for strength since it will mechanically suspend the pulley system and attached instrumentation (at least during installation and removal). As shown, the projections of the pin on either side of the stud are of equal length, but they could be made of unequal length, with corresponding slot lengths, to provide a particular orientation for installation (vs. two 180° apart). The spring, while optional, is highly desirable. First, the compression force provides tactile feedback to the operator during installation or removal. Second, the spring can be designed to maintain proper stud engagement during a seismic event by selecting the spring constant based on the anticipated maximum vertical seismic acceleration. The spring constant "k" should be equal to or greater than "ma/x" where "m" is the mass of the pulley and stud assembly, "a" is the seismic acceleration, and "x" is the compression distance (i.e. the depth of the engagement groove). The spring could be a wavy washer or conical to provide significant force with limited vertical displacement.

Figure 1B:
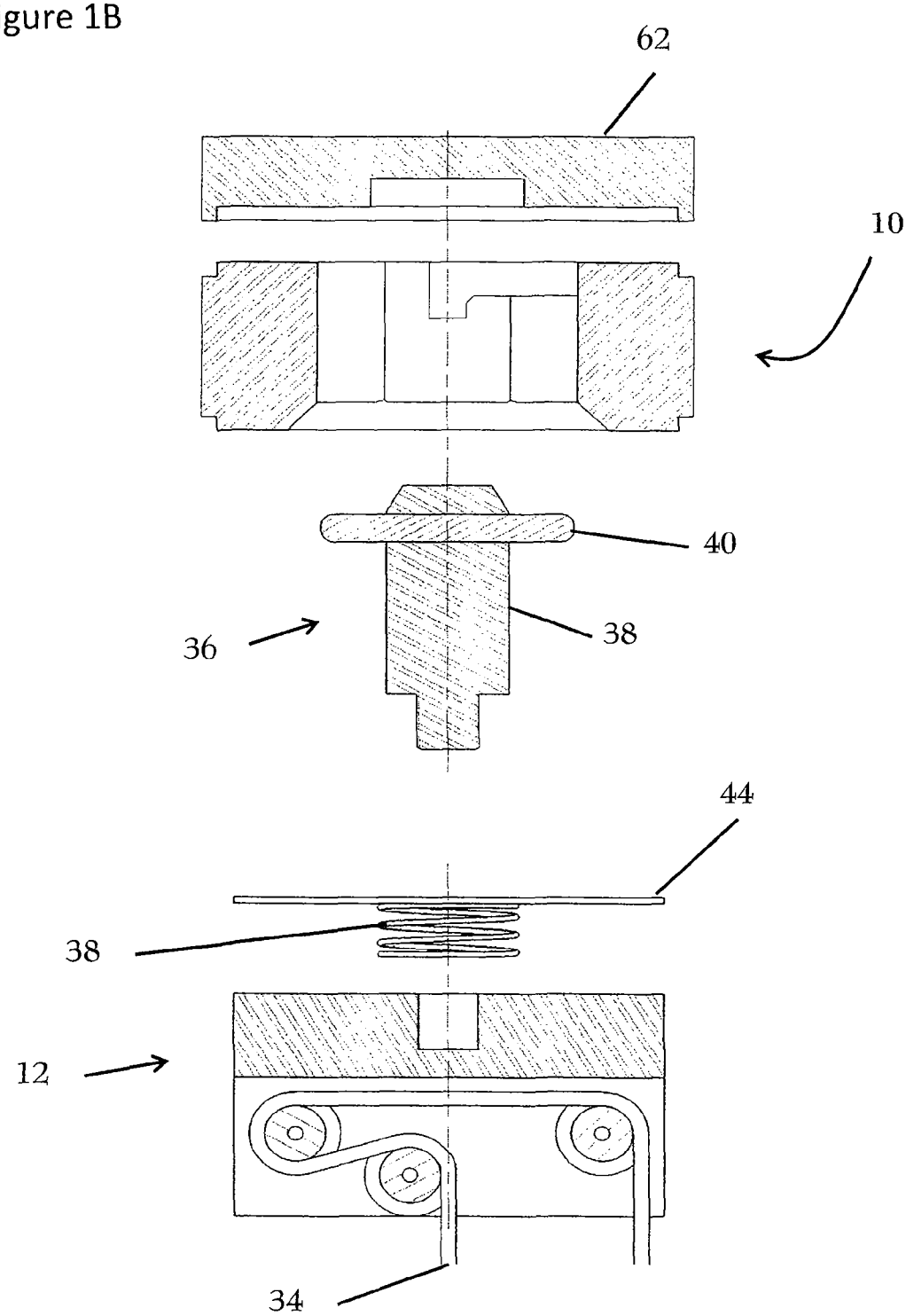

FIG. 1B shows the main components of a receptacle and pulley system of the present technology. Receptacle 10 is mounted at the top of a well. Receptacle 10 is configured to releasably receive and hold stud assembly 36, which includes a projecting engagement pin 40. Pulley assembly 12 is connected to stud assembly 36 with the spring 38 and spring plate 44 therebetween. Suspension cable 34 is strung on pulley assembly 12. A cap 62 is placed over receptacle 10 to provide a cover and a stop.

Figure 3B:
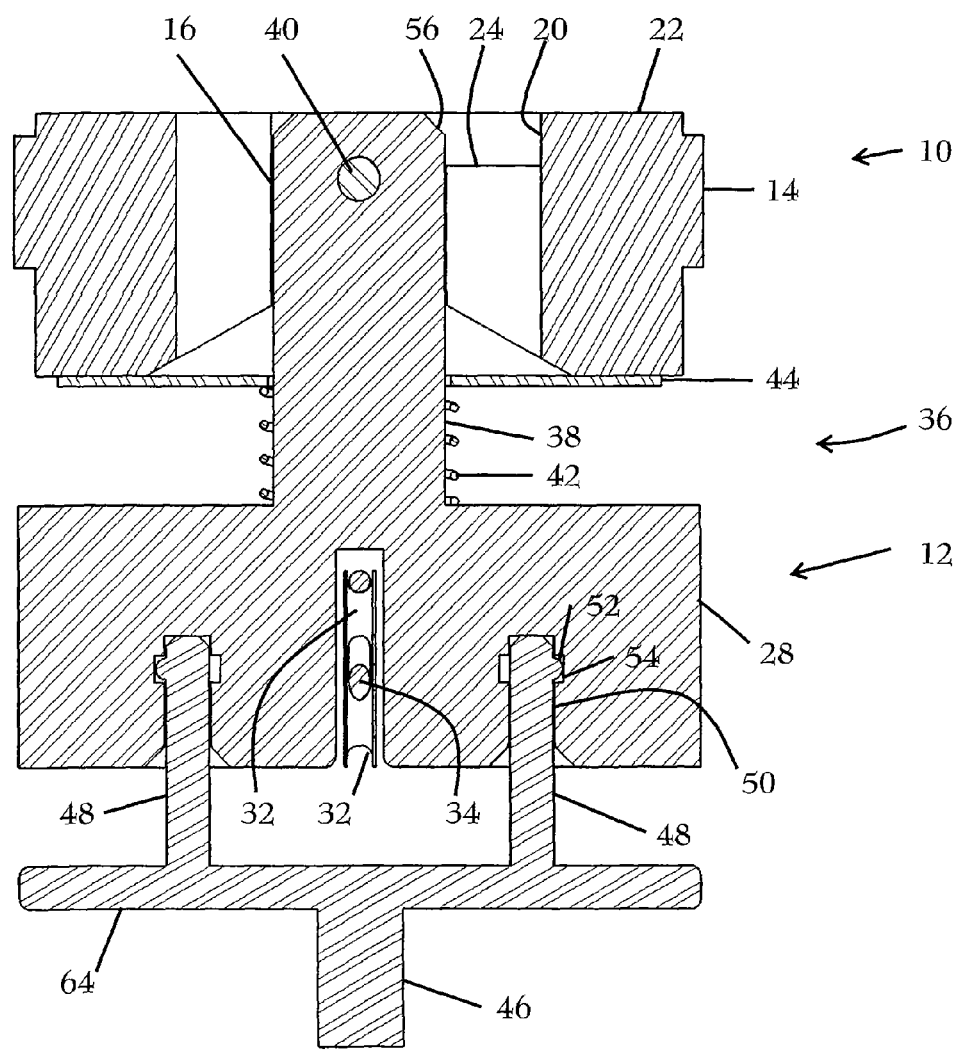
FIGS. 3C, D are perspective views showing the pin being rotated and seated in the receptacle.
Figure 3C:
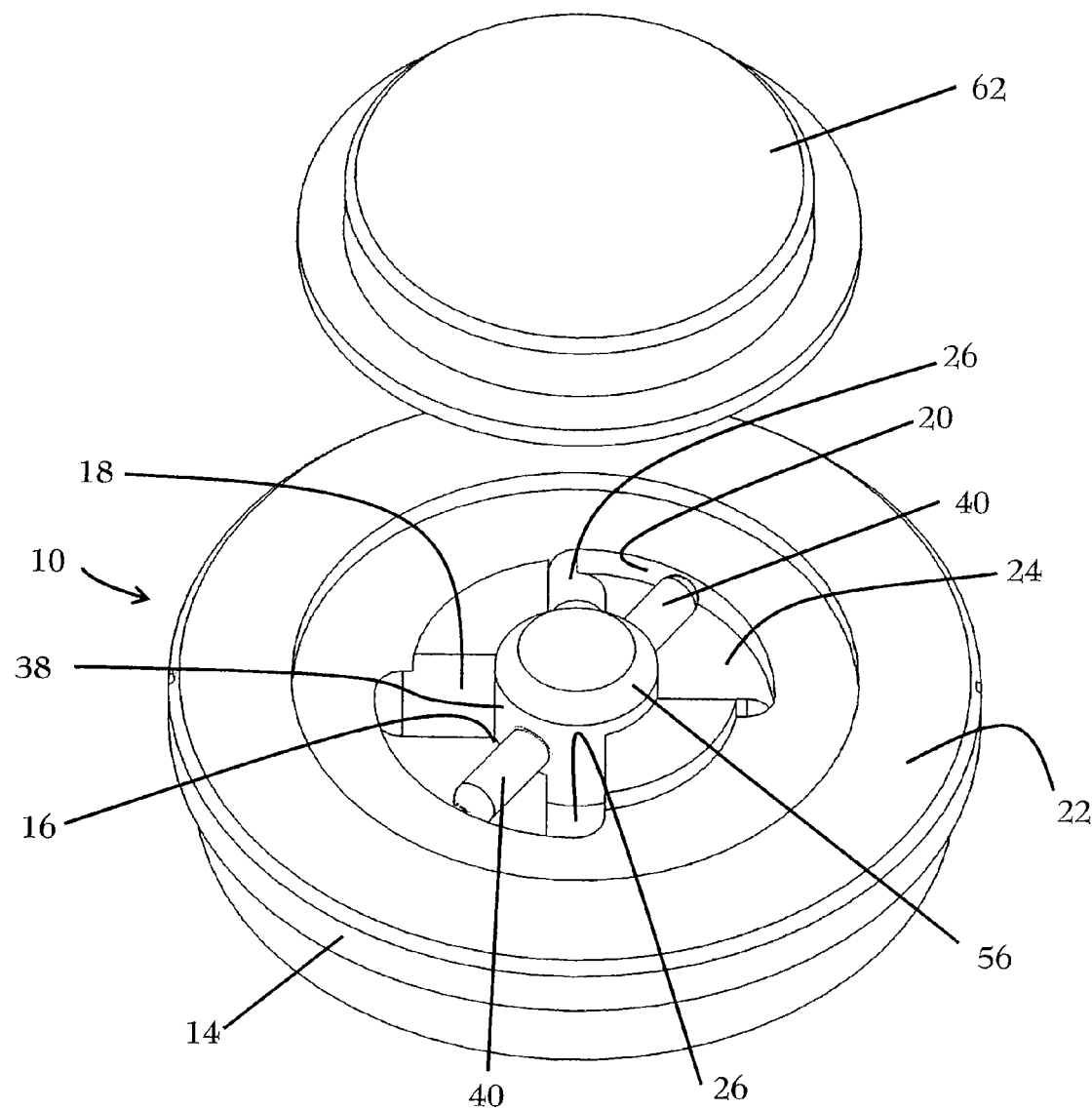
Figure 3D:
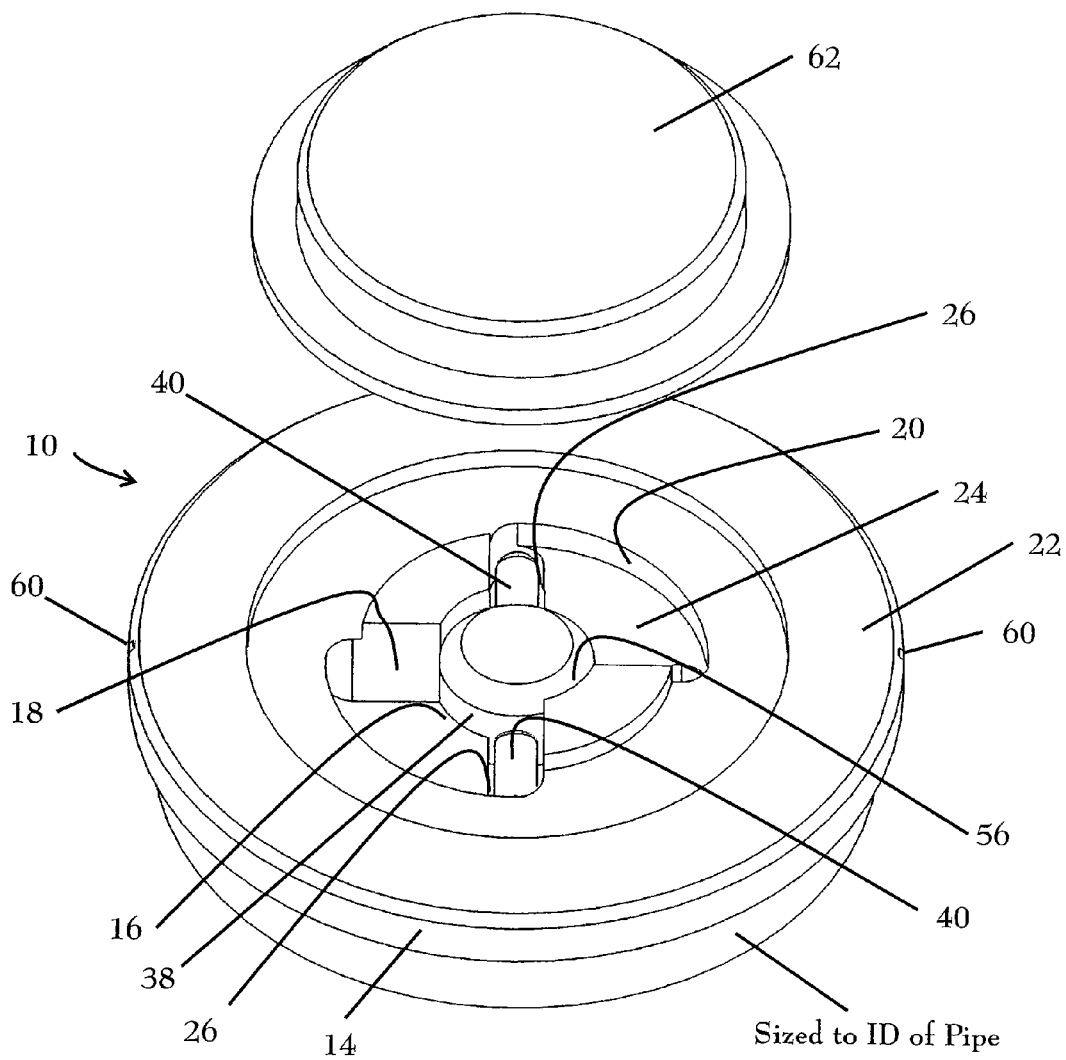

In operation, as shown in FIGS. 1A, 3A, B, a telescoping insertion and removal tool 46 having a pair of prongs 48 extending from a guide flange 64 is used. Prongs 48 fit into holes 50 on the bottom of body 28 of pulley assembly 12 and are held in engagement by spring loaded members (balls) 52 which releasably extend into recesses 54 which extend from holes 50, as shown in FIG. 3B. Guide flange 64 is sized to fit the well pipe diameter and facilitates engagement of the prongs 48 to remove the pulley assembly since the pulley assembly is at the top of the well and the operator manipulating the tool is at the bottom of the well. Flange 64 also has a slot 66 for the cable 34 to pass.

To attach pulley assembly 12 to receptacle 10, pulley assembly 12 is raised by means of tool 46 until stud assembly 36 is brought into contact with receptacle 10. Tool 46 will generally be a telescoping tool or assembled in segments as described further below. The top of cylindrical member or stud 38 may have a taper 56 and the bottom of bore 16 may have a chamfer or bevel 58 to facilitate alignment and engagement. Tool 46 is rotated so that the engagement pin 40 is aligned with the slots 18 in receptacle 10. Using tool 46, pulley assembly 12 is pushed up against force from spring 42 so that cylindrical member 38 passes up through bore 16 and engagement pin 40 passes up through slots 18 until engagement pin 38 is above bottom surfaces 24 of recesses 20. Tool 46 is then rotated 90° so that pin 40 rotates 90° and is positioned over grooves 26. Upward force on tool 46 is then released and the spring 42 forces pin 40 down into grooves 26. Tool 46 is then pulled out from body 28 and removed. A reverse process is followed to remove the pulley assembly. The bottom surfaces 24 of recesses 20 thus provide the support surface for pin 40. Grooves 26 in surfaces 24 are not absolutely required but are highly preferred so that pin 40 cannot freely rotate on the support surface. Spring 42 snaps pin 40 into grooves 26 and holds pin 40 in place.

The position of the slots 18 and grooves 26 facilitates attachment of pulley assembly 12 to receptacle 10. Because slots 18 are at one side of recesses 20, pulley assembly 12 can only be rotated in one direction, toward grooves 26. Because grooves 26 are at opposed sides of recesses 20 from slots 18, when pulley assembly 12 can be rotated no further, pin 40 is aligned with grooves 26. The same is true for the reverse removal process.

Thus the present technology provides a simple means and method for installing and removing a pulley assembly from the top of a well with access only from the bottom. Using a telescoping installation/removal tool, the strung pulley/stud assembly is lifted up to the preinstalled receptacle assembly and engaged. The pulley/stud assembly is pushed up and rotated until it engages into the receptacle slot. By pushing up further, the stud engagement pin rises in the slot (compressing the optional spring). Once the stud hits the top of the receptacle, the installer rotates it 90° until it hits stops. Then the pulley/stud assembly is lowered slightly to seat the engagement pin protrusions. To verify proper engagement, the operator attempts to rotate the installed pulley/stud assembly. If properly installed, it will not rotate. The tool is then removed and the stranded wire rope movement is verified.

To remove the pulley/stud assembly, the tool is inserted in the well and brought into engagement with the pulley/stud assembly. The tool is then pushed further up to unseat the engagement pin, and then rotated until a stop is reached, when the pin will be aligned with the receptacle slots. The tool is then lowered, bringing the pulley/stud assembly down the well.

Figure 4:
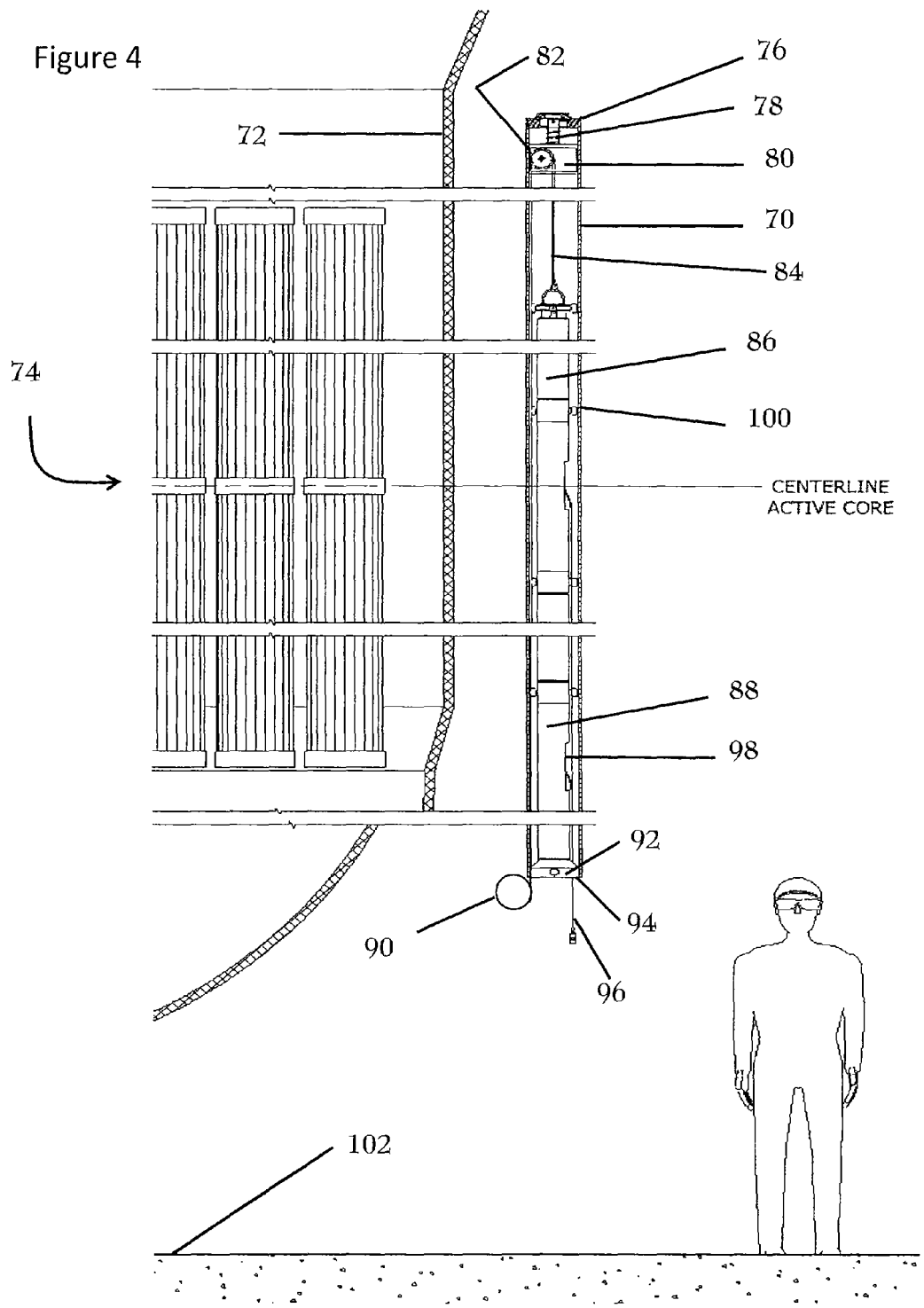
FIG. 4 illustrates a reactor ex-core inverted well with the receptacle and pulley assembly of the present technology mounted at the top.

FIG. 4 shows an ex-core instrument well 70 in proximity to a reactor vessel 72 that encloses reactor core 74. At the top of well 70 is a receptacle 76 as described above which was installed during construction. Receptacle 76, typically with a welded cap, is welded or bolted (using a flange) to the well pipe during construction. If welded, the receptacle 76 also functions to seal the well top. Suspended from receptacle 76 by stud assembly 78 is a pulley assembly 80 that has a single pulley 82 mounted thereon. Stud assembly 78 and pulley assembly 80 can also be initially installed from the top when receptacle 76 is installed (or may be installed later), but all further access to pulley assembly 80 must be from the bottom of well 70. Passing over pulley 82 is a support cable 84, one end of which is connected to the top of a detector assembly 86 mounted on a support tube 88, the other end of which is connected to a winch 90. Winch 90 is used to raise and lower detector assembly 86 for servicing or replacement. Winch 90 can be replaced with a simple securing hook and articulation done by hand. When the detector assembly 86 is in position, a mounting plate 92 is affixed to the bottom of well 70 to support the detector assembly 86 and support tube 88. A hole 94 in mounting plate 92 allows electrical MI cables 96 to pass into well 70, where they pass through a cable cut-out slot 98 in support tube 88 to detector assembly 86.

A plurality of ceramic spacers 100 around the detector assembly 86 keep the detector assembly 86 centered in well 70 and also provide electrical insulation. The well 70 and reactor vessel 72 are positioned above a reactor floor 102. The distance from floor 102 to the bottom of well 70 may be much less than the height of the detector assembly 86. Therefore when the detector assembly 86 is being installed or removed from the bottom of well 70, it must be done in segments, each about 4-5 feet long, e.g. a first segment is attached to cable 84 and raised into well 70, then a second segment is attached to the first segment and the two joined segments are raised, and the process is repeated further if necessary until assembly is completed. When pulley assembly 80 is being removed from or reinserted into well 70, the process must also be done in stages as the tool 46 must be assembled in segments, as described further below.

Figure 5:
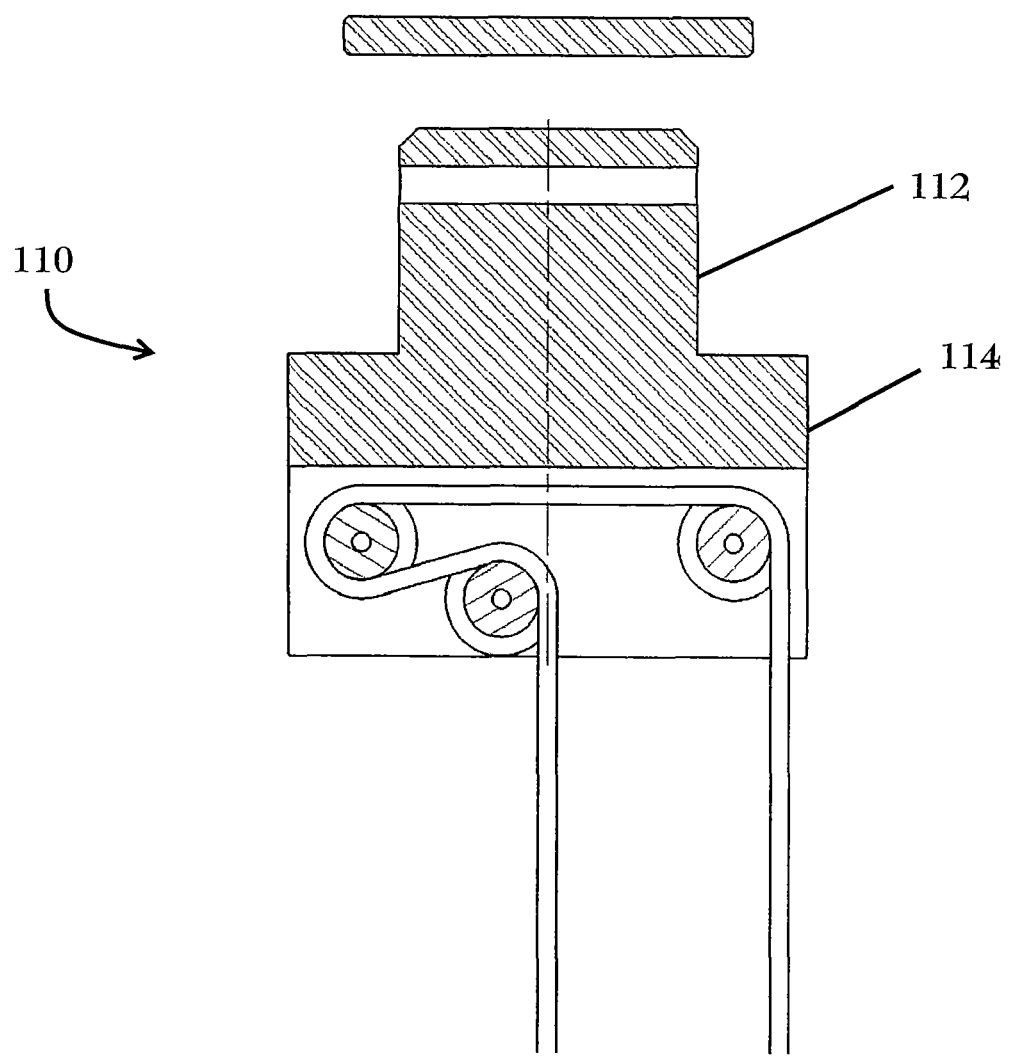
FIG. 5 illustrates an alternate embodiment of an integrated pulley and stud assembly of the present technology.

The configuration of individual components of the present technology may be varied from the embodiment described above. For example, FIG. 5 shows an integrated pulley and stud assembly 110 in which the diameter of the stud 112 is substantially greater relative to the diameter of pulley assembly 114 than stud 38 in FIG. 1A. The wider stud 112 provides a lower bending or tipping moment to the assembly 110, mitigating mechanical momentum on the pulley assembly due to wire rope forces. As previously mentioned, the pulley and stud assemblies can be formed as a one piece integral unit or can be made of two separate units joined together. The two units could be fixedly joined together, e.g. by screwing together, in which case an anti-unthreading mechanism could be added, or they could be rotatably joined together to allow the suspension cable to exit from different radial locations at the well bottom.

Figure 6A:
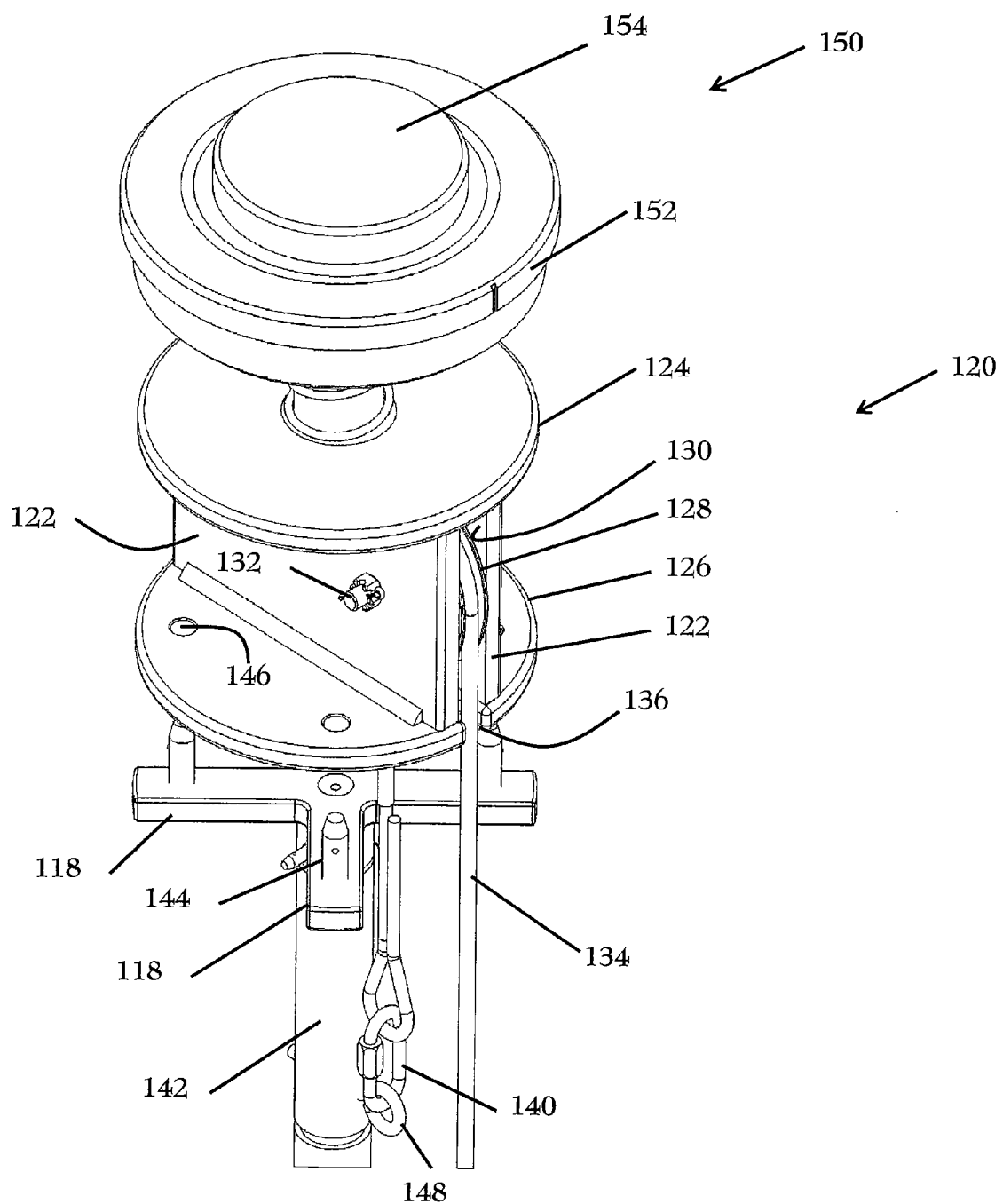
FIGS. 6A-C are a perspective and two side views of another embodiment of a pulley and stud assembly of the present technology.
Figure 6B:
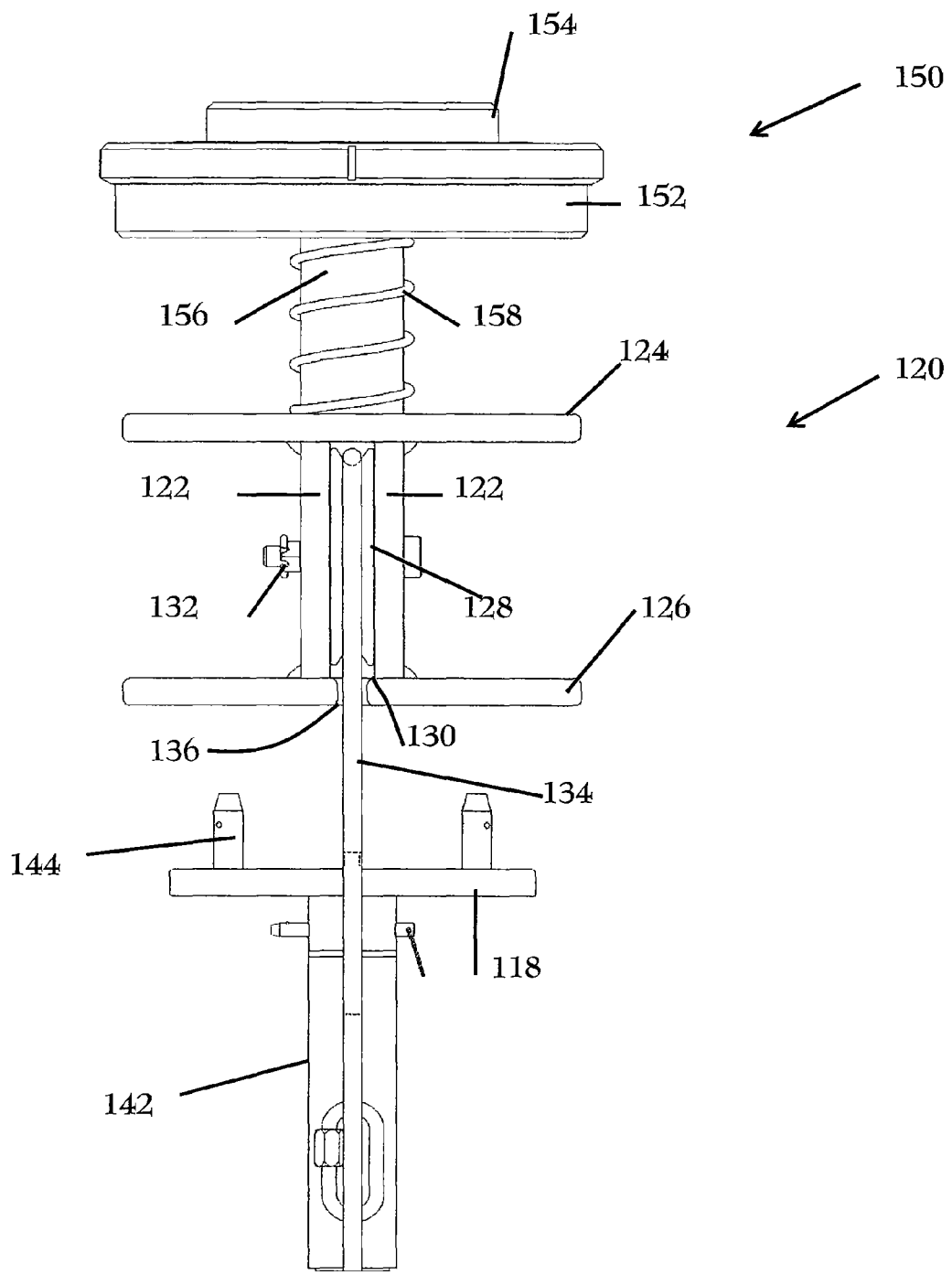
Figure 6C:
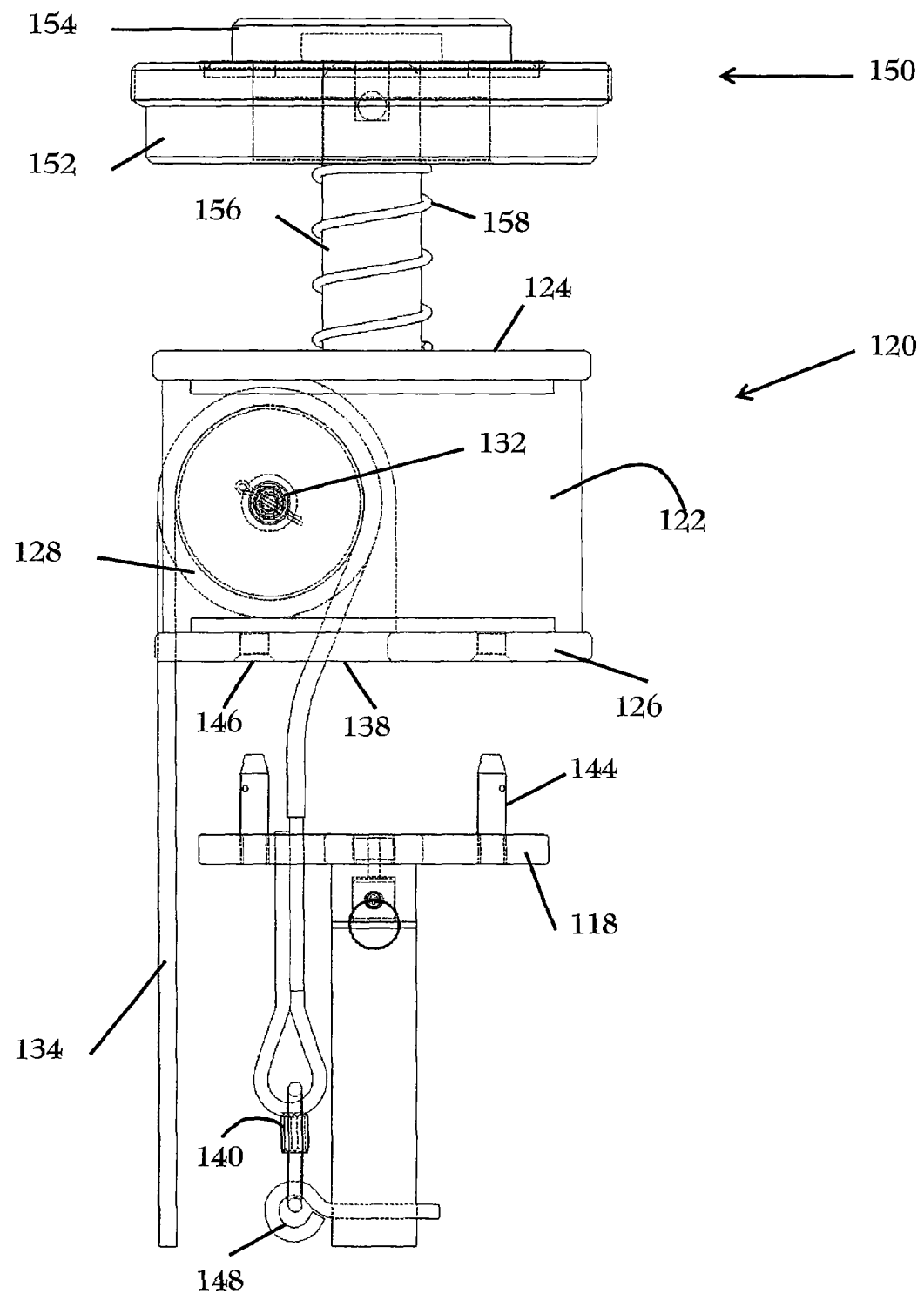

FIGS. 6A-C show another variation in the pulley and stud assembly of the present technology. In the prior embodiments, the pulley assembly was formed of a substantially solid cylindrical body with a slot for the pulleys. FIGS. 6A-C show a pulley assembly 120 formed of two spaced vertical plates 122 between a horizontal top circular plate 124 and a horizontal bottom circular plate 126. A pulley 128 is rotatably mounted in the space 130 between vertical plates 122 on an axle 132. A cable 134 passes over pulley 128. One end of cable 134 passes along the inner diameter or surface of the well, passing through a small notch 136 on the edge of bottom plate 126. The other end of cable 134 passes through a hole 138 in the center of bottom plate 126 and has a coupling 140 attached to the end thereof for connecting to the detector assembly or other instrument package.

Assembly 120 is lowered and raised in a well by means of a tool 142 that has a plurality of prongs 144 (in this case 4) which releasably engage holes 146 in bottom plate 126. At its top end, tool 142 has four spaced arms 118 from which the prongs 144 extend. The lengths of arms 118 are sized to the well pipe inner diameter to aid in alignment. The coupling 140 at the instrument attachment end of cable 134 may be releasably attached near the top of tool 142 by a pin 148 during installation of assembly 120. Then, when tool 142 is withdrawn from the well, the end of cable 134 with coupling 140 will be pulled down to the bottom of the well.

Pulley assembly 120 is attached to a receptacle 150 as previously described, by means of a stud 156. Receptacle 150 includes a base 152, which is configured like receptacle 10 of FIG. 1A. Receptacle 150 also includes a cap 154 that covers the top of base 152. While cap 154 is not absolutely necessary, it is preferred because it provides a stop for stud 156 when stud 156 is raised through base 152. Cap 154 also prevents debris from entering base 152 to prevent debris from fouling the engagement pin or to prevent debris from falling into the instrument well. The cap can also be used to make the base and instrument well hermetic in differential pressure situations or where hazardous substances are present. Thus a cap 154 will typically be welded to base 152 when receptacle 150 is installed at the top of a well. A spring 158 is placed around stud 156 between upper plate 124 and base 152.

Figure 7A:
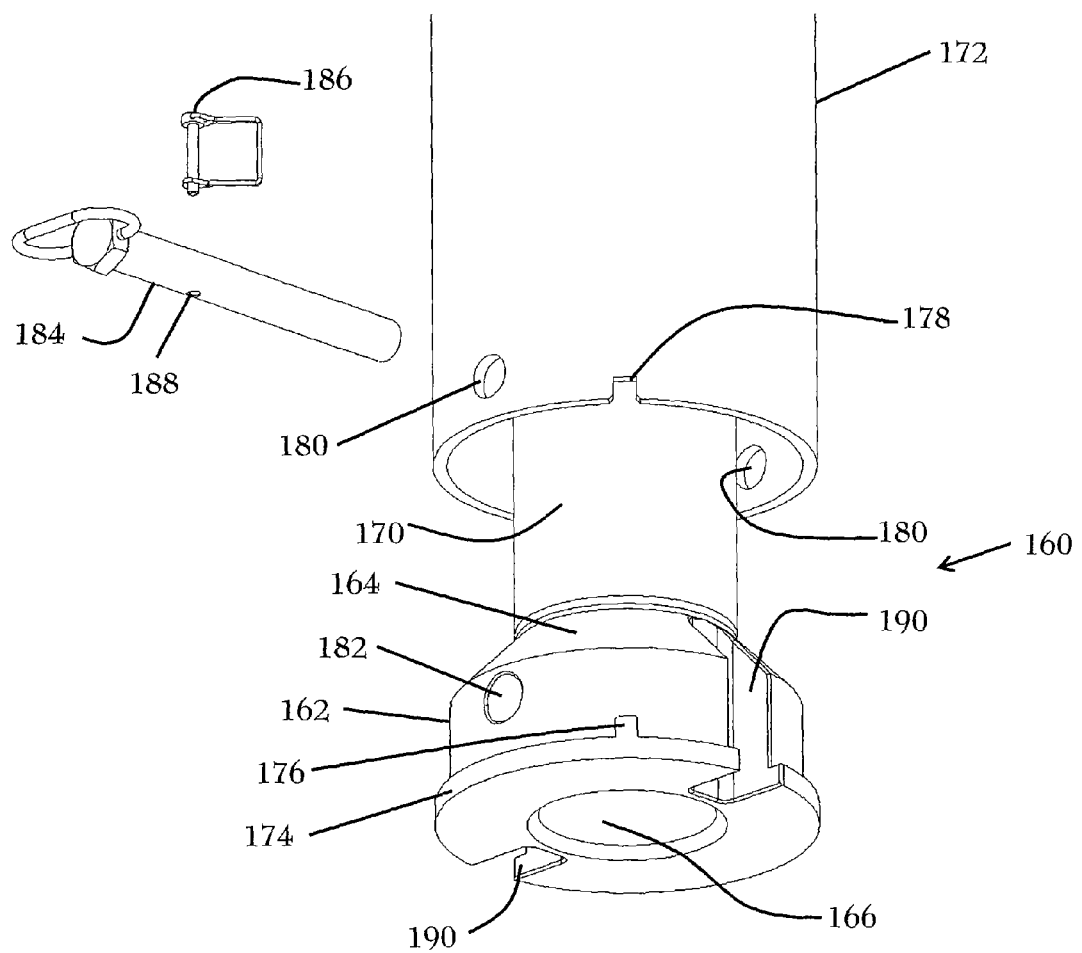
FIGS. 7A, B are a perspective view and a perspective view partly in section of an instrument well securing base of the present technology being installed.
Figure 7B:
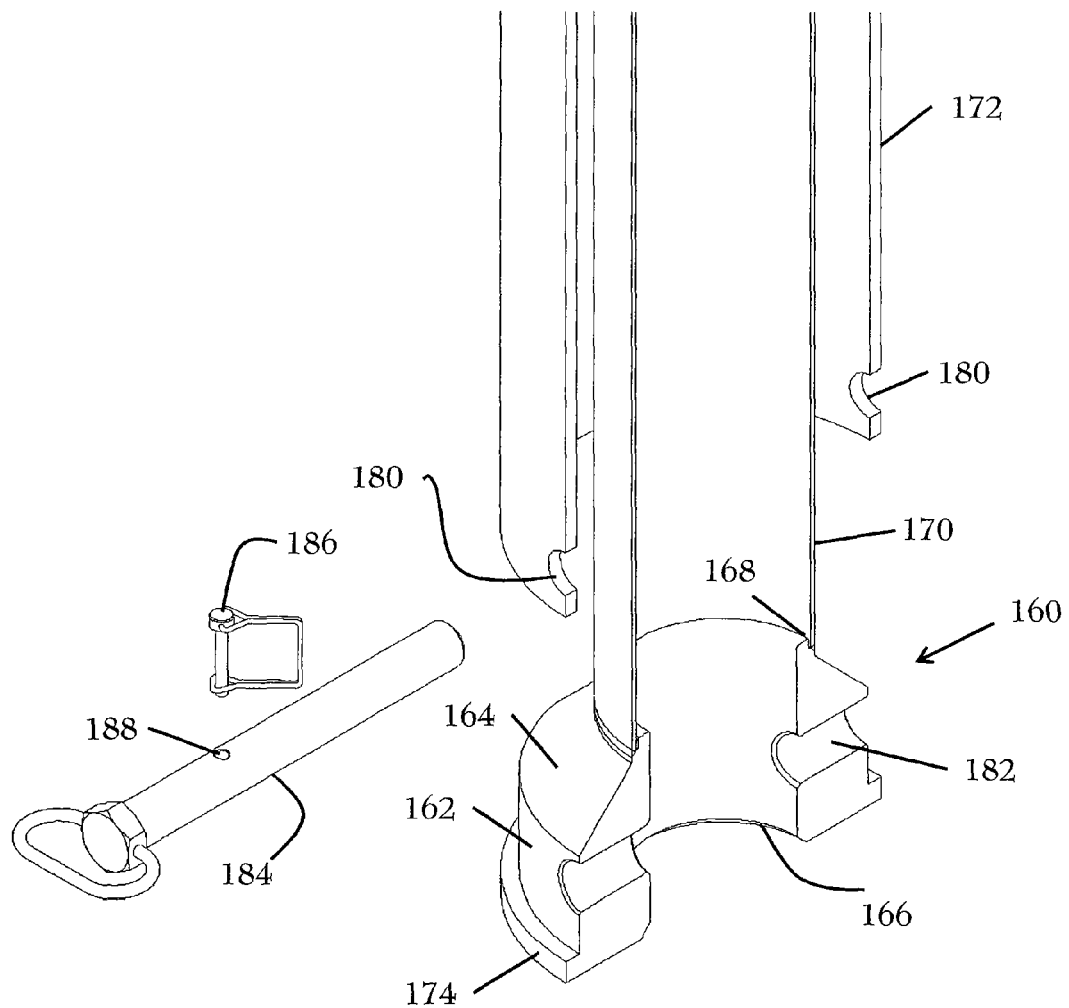
FIG. 7C is a cross sectional side view of the securing base of FIGS. 7A, B installed in the bottom of a well.
FIG. 7D is a cross sectional side view of a variation of the securing base of FIGS. 7A-C.
Figure 7C:
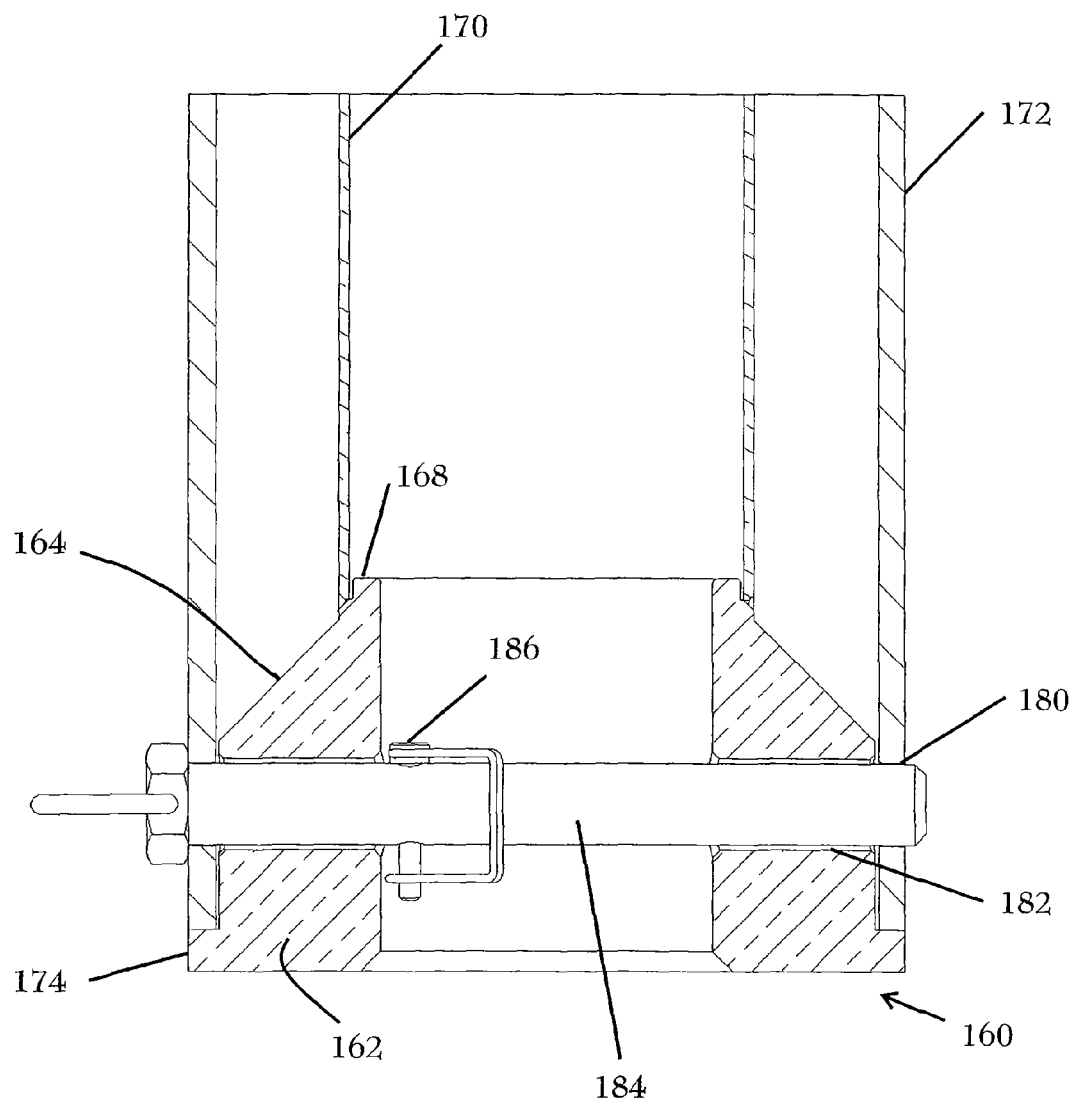

In FIG. 4, the detector assembly 86 is secured to the bottom of well 70 by a mounting plate 92 and support tube 88. This is typically accomplished by bolting the mounting plate to a flange at the bottom of the well pipe. However, in some reactor designs, there may be no flange (protruding rim with holes) for easy connection of the mounting plate. FIGS. 7A-C show a securing base of the present technology that does not require a flange at the bottom of the well for mounting and that can be used in combination with the pulley assembly and receptacle of the present technology.

As shown in FIGS. 7A-C, securing base 160 has a substantially cylindrical body 162 with a tapered or conical upper portion 164, and a central bore 166 therethrough. The upper edge 168 of upper portion 164 has a diameter that just fits inside instrument detector support tube 170 so that the top of base 160 can engage (e.g. be welded to) the bottom of tube 170 to form a detector assembly pedestal. Body 162 has a diameter that just fits inside instrument well 172. The bottom of base 160 may also include a circumferential lip or flange with a width equal to the thickness of well 172 to provide a vertical stop. Flange 174 may also include a rotational locating tab 176 which engages a notch 178 in the bottom of well 172 to aid during installation alignment.

Well 172 has a pair of aligned opposed holes 180 near the bottom thereof. Base 160 has a pair of aligned opposed bores 182. When the detector assembly (not shown) with attached pedestal (instrument tube 170 and base 160) is raised (by means of the cable on the pulley system) to the proper position, e.g. when flange 174 contacts the bottom of well 172 and tab 174 engages notch 178, the bores 182 will be aligned with holes 180. A securing pin 184 can then be pushed through the aligned holes 180 and bores 182 to hold base 160 in place at the bottom of the well (the head of pin 184 acts as a stop). Pin 184 is very sturdy, e.g. 1" diameter stainless steel, so it can easily support the detector assembly or instrument package (which may also be supported at its top end by the pulley cable). A pin retainer 186 can be inserted through a small hole 188 in pin 184 by reaching up through central bore 166 to prevent pin 184 from sliding out. Base 160 also has a pair of vertical slots 190 in its circumference to provide space for the detector cables and pulley rope.

Figure 7D:
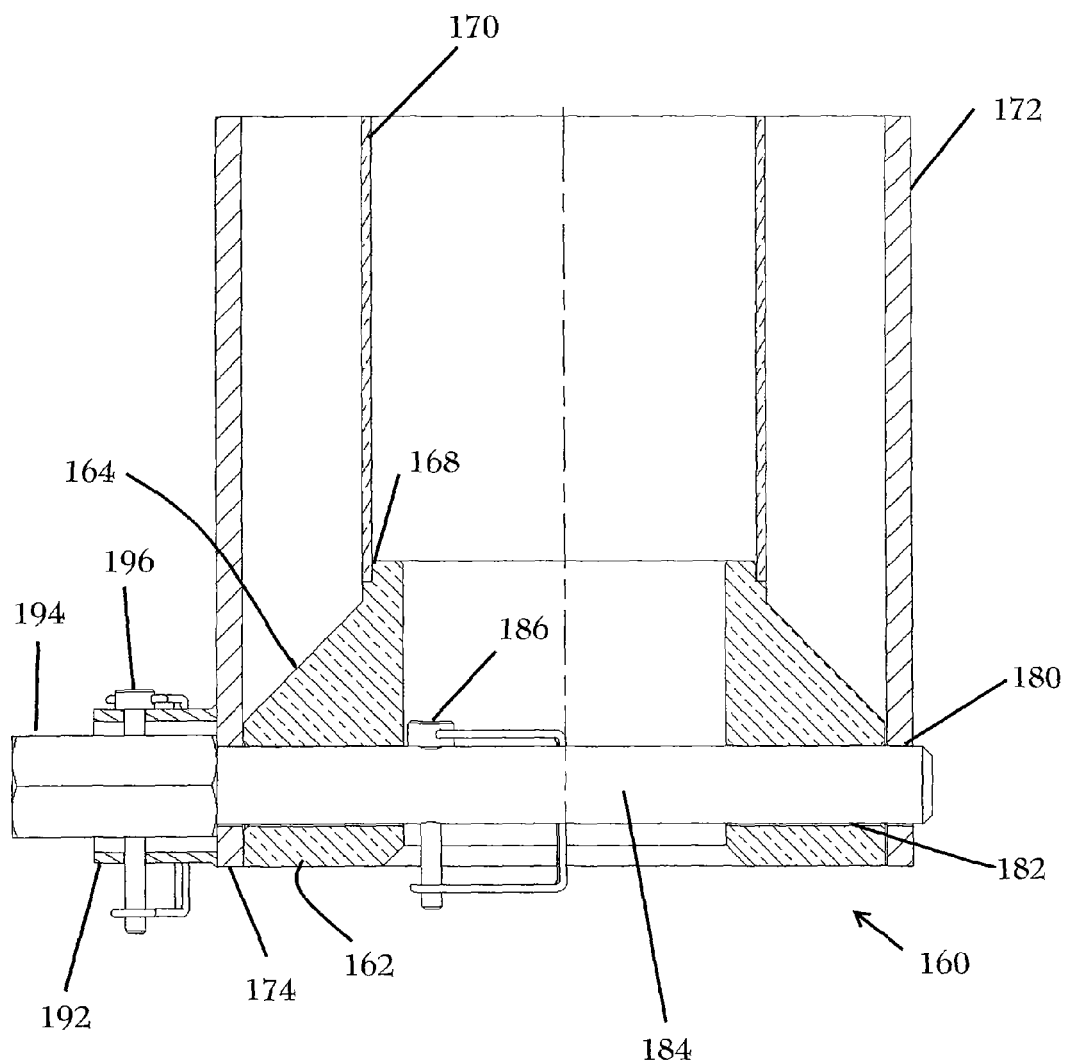

FIG. 7D shows an alternate external lock for the securing pin of the securing base of FIGS. 7A-C; most of the components are the same as before. A short locking tube 192 is attached (e.g. welded) externally to the bottom of instrument well 172 in alignment with one of the holes 180. Securing pin 184 has an elongated head 194 which fits into locking tube 192. Head 194 acts as a stop when it reaches well 172 when securing pin 184 is inserted through holes 180 and bores 182. Pin 184 may be locked in place by a retainer 186 inside body 162 as before, and can also be locked in place by a similar retainer 196 which passes through locking tube 192 and head 194. Either or both retainers 186, 196 can be used. Body 162 does not have a flange 174 as in FIGS. 7A-C but merely fits snugly inside well 172.

Figure 8:
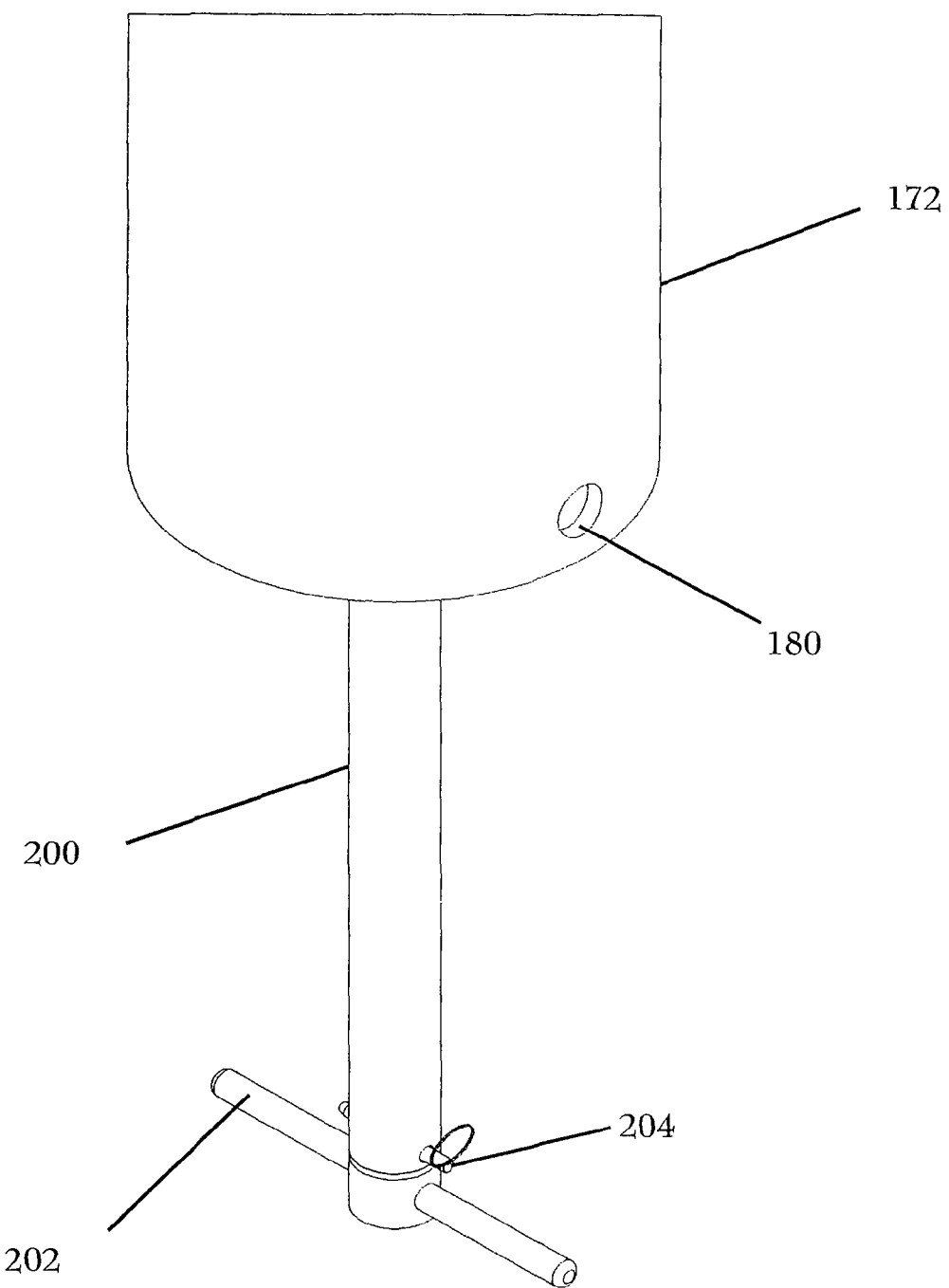
FIG. 8 illustrates the bottom of the pulley assembly lifting tool during installation or removal.

As previously described, the height of an instrument well may be much greater than the available space below the well so the lifting tool must be a telescoping tool or must be assembled in segments as installation is carried out. FIG. 8 illustrates the bottom end of the lifting tool during installation or removal. A lifting tool segment 200 is shown extending up into well 172. A handle 202 is shown removably attached by a removable pin 204 near the bottom of lifting tool segment 200. Handle 202 is used to lift or lower the pulley assembly and to turn the stud assembly so that the engagement pin is rotated for installation or removal of the pulley assembly. The process can be done in stages, i.e. tool segment 200 is temporarily supported while another segment is connected to the bottom of segment 200, and the handle 202 is attached to the lower segment.

The materials used for fabrication of the components of the present technology will be selected for the chemical, temperature and radiation environment of application. The receptacle will typically be made of stainless steel, and can be welded to the top of the steel well pipe. If the well pipe is made of a different material, then the receptacle will also be made of a compatible material to facilitate welding. The pulley assembly and stud assembly can also be stainless steel or they can be made of titanium for lighter weight. Other materials, including alumina ceramics, can also be used if they have the strength and durability. Some metal parts will remain in contact with other metal parts for long periods of time, e.g. the engagement pins with the grooves of the receptacle and the pulleys with the wire ropes. To prevent these parts from freezing or cold welding together, they can be coated with a suitable coating material. In particular the parts can be nitrided, e.g. by cathodic arc deposition of titanium nitride (TiN) or zirconium nitride (ZrN) coatings. The wire rope may also be electrically insulated with fiberglass or similar insulating sleeving. Weight reducing holes can also be drilled into solid bodies for lighter weight.

The present technology thus provides an internally replaceable suspension assembly and method of attachment for use in tubular structures where there is limited access to the suspension mounting area or that can be accessed only from the bottom. The pulley assembly apparatus and method of mounting allow repair and re-stringing in applications where there is limited access to the pulley assembly mounting area. The system is particularly advantageous for nuclear power plants with bottom mounted instruments, but can be used for any other application where a replaceable suspension assembly is required and there is limited access to the mounting interface. The present technology provides a replaceable pulley assembly for repair or for replacement with a different design. The present technology also allows for re-stringing if the wire rope is broken or disengaged.

Broadly this writing has disclosed the following. A method and apparatus to mount a pulley system at the top of an inverted well where there is no access or limited access to the pulley system mounting area at the top of the well after construction, so that all further access must be or is more practical from the bottom of the well. A receptacle is mounted at the top of the well and a removable pulley assembly can be installed in, removed from and re-installed in the receptacle from the bottom of the well. The receptacle has a central bore and a pair of slots extending from the central bore, and a support surface around part the central bore and slots. The stud of a stud assembly is removably inserted into the central bore and raised such that an engagement pin extending from the stud passes through the slots. The stud is then rotated such that the pin rests on the support surface, preferably engaged in grooves in the support surface. The pulley assembly is attached to the stud assembly. A lifting tool engages the pulley assembly. A securing base that fits into the bottom of the well pipe may be installed once a detector assembly has been raised by the pulley assembly to support the detector assembly from the bottom.

In greater detail, this writing has disclosed the following concepts.

Concept 1. Apparatus, comprising:
a receptacle defining therethrough a central bore and a pair of opposed slots extending from the central bore, and having a support surface surrounding in part the central bore and slots;
a stud assembly comprising a stud and an engagement pin extending orthogonally to the stud, wherein the stud is removably inserted into the central bore and raised such that the pin passes through the slots, and further wherein the stud is then rotated such that the pin rests on the support surface;
a pulley assembly attached to the stud assembly.

Concept 2. The apparatus of Concept 1 wherein the receptacle is mounted at the top of an inverted well, and the pulley assembly has a diameter that just fits inside the well.

Concept 3. The apparatus of Concept 1 wherein the stud assembly and the pulley assembly are fixedly attached together.

Concept 4. The apparatus of Concept 1 wherein the stud assembly and the pulley assembly are formed as a single integral unit.

Concept 5. The apparatus of Concept 1 further comprising a pair of grooves formed in the support surface to receive the pin when the pin is resting on the support surface.

Concept 6. The apparatus of Concept 5 further comprising a pair of opposed quadrant recesses formed in the receptacle and defining the support surface therein, one slot being positioned at one side of each recess and one groove being positioned at the opposite side of each recess.

Concept 7. The apparatus of Concept 1 further comprising a cap on the receptacle.

Concept 8. The apparatus of Concept 1 wherein the bottom edges of the central bore and the slots are beveled or chamfered, and the top of the stud is beveled or tapered to facilitate engagement.

Concept 9. The apparatus of Concept 1 further comprising a plurality of apertures formed in the bottom of the pulley assembly for engagement of a lifting tool.

Concept 10. The apparatus of Concept 1 wherein the apparatus is an inverted well system, comprising:
a well pipe;
the receptacle being mounted at the top of the well pipe;
the pulley assembly being sized to substantially fit the well pipe inner diameter.

Concept 11. The apparatus of Concept 1 or Concept 10 further comprising a spring positioned around the stud to provide compression force when the stud is raised through the central bore.

Concept 12. The apparatus of Concept 10 further comprising a telescoping or segmented lifting tool that removeably engages the bottom of the pulley assembly for raising and lowering and turning the pulley assembly to engage and disengage the pin from resting on the support surface.

Concept 13. The apparatus of Concept 1 or 10 wherein the pulley system comprises one or more pulleys and a cable passing over the one or more pulleys, and further wherein the one or more pulleys are configured so that one end of the cable is centered and the other end is positioned along the outside edge.

Concept 14. The apparatus of Concept 13 wherein the apparatus further comprising an instrument package positioned in the well and connected to the centered end of the cable.

Concept 15. The apparatus of Concept 14 further comprising a securing base that fits into the bottom of the well pipe and is releaseably secured thereto, and that supports the instrument package.

Concept 16. The apparatus of Concept 15 wherein the securing base comprises a substantially cylindrical body with a tapered or conical upper portion, and a central bore therethrough, the upper portion having an upper edge with a diameter that engages the instrument package, the body having a diameter that just fits inside the instrument well.

Concept 17. The apparatus of Concept 16 wherein the well pipe has a pair of aligned opposed holes near the bottom thereof, and the base has a pair of aligned opposed bores therethrough, such that when the base is raised to a securable position, the bores will be aligned with the holes, and further comprising a securing pin that can then be pushed through the aligned holes and bores to hold base in place at the bottom of the well.

Concept 18. A method of removeably mounting a pulley assembly from the bottom in an inverted well where there is limited access to the top of the well, comprising:
mounting a receptacle at the top of the well during construction thereof, the receptacle defining therethrough a central bore and a pair of opposed slots extending from the central bore, and having a support surface surrounding in part the central bore and slots;
providing a stud assembly comprising a stud and an engagement pin extending orthogonally to the stud, with the pulley assembly attached to the stud assembly, the pulley assembly being sized to substantially the well pipe diameter;

engaging the bottom of the pulley assembly with a lifting tool;

lifting the tool so that the stud is removably inserted into the central bore and raised such that the pin passes through the slots, and then rotating the tool so that the stud is then rotated such that the pin rests on the support surface, to install the pulley assembly at the top of the well, lifting the tool so that the pin is raised from the support surface, then rotating the tool so that the pin is positioned over the slots, then lowering the tool so that the stud slides down the central bore and the pin passes down through the slots, to remove the pulley assembly from the top of the well, Concept 19. The method of Concept 18 wherein the tool is a telescoping tool or is assembled and disassembled in segments.

Although the description above contains many details, these should not be construed as limiting the scope of the present technology but as merely providing illustrations of some of the presently preferred embodiments of this present technology. Therefore, it will be appreciated that the scope of the present technology fully encompasses other embodiments which may become obvious to those skilled in the art, and that the scope of the present technology is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present technology, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. An apparatus for providing a replaceable suspension assembly in an inverted well, the interior of the inverted well being accessible from its bottom after initial construction thereof, comprising:
    a receptacle defining therethrough a central bore and a pair of opposed slots extending from the central bore, and having a support surface surrounding in part the central bore and slots, the receptacle being fixedly attached at the to of the inverted well with the support surface in a substantially horizontal orientation and the central bore and slots in a substantially vertical orientation;
    a stud assembly comprising a vertically oriented stud and an engagement pin extending orthogonally to the stud, wherein the stud is removably inserted into the central bore and raised such that the pin passes through the slots, and further wherein the stud is then rotated such that the pin rests on the support surface to support the stud in the receptacle, and the stud is raised and rotated so that the pin aligns with the slots and the stud is lowered to remove the stud from the receptacle; and
    a pulley assembly attached to and below the stud assembly, the pulley assembly comprising a pulley and an axle on which the pulley is mounted, the axle being spaced apart from and substantially orthogonal to the stud, wherein the pulley assembly is mounted in and removed from the interior of the well from its bottom by engaging and disengaging the stud from the receptacle.

2. The apparatus of claim 1 wherein the pulley assembly has a diameter that just fits inside the well.

3. The apparatus of claim 1 wherein the stud assembly and the pulley assembly are fixedly attached together.

4. The apparatus of claim 1 wherein the stud assembly and the pulley assembly are formed as a single integral unit.

5. The apparatus of claim 1 further comprising a pair of grooves formed in the support surface to receive the pin when the pin is resting on the support surface.

6. The apparatus of claim 5 further comprising a pair of opposed quadrant recesses formed in the receptacle and defining the support surface therein, one slot being positioned at one side of each recess and one groove being positioned at the opposite side of each recess.

7. The apparatus of claim 1 further comprising a cap on the receptacle.

8. The apparatus of claim 1 wherein the bottom edges of the central bore and the slots are beveled or chamfered, and the top of the stud is beveled or tapered to facilitate engagement.

9. The apparatus of claim 1 further comprising a plurality of apertures formed in the bottom of the pulley assembly for engagement of a lifting tool.

10. The apparatus of claim 1 wherein the inverted well comprises a well pipe; the receptacle being mounted at a top of the well pipe; the pulley assembly being sized to substantially fit the well pipe inner diameter.

11. The apparatus of claim 10 wherein the pulley system comprises one or more pulleys and a cable passing over the one or more pulleys, and further wherein the one or more pulleys are configured so that one end of the cable is centered and the other end is positioned along the outside edge.

12. The apparatus of claim 11 wherein the apparatus further comprising an instrument package positioned in the well and connected to the centered end of the cable.

13. The apparatus of claim 12 further comprising a securing base that fits into a bottom of the well pipe and is releaseably secured thereto, and that supports the instrument package.

14. The apparatus of claim 13 wherein the securing base comprises a substantially cylindrical body with a tapered or conical upper portion, and a central bore therethrough, the upper portion having an upper edge with a diameter that engages the instrument package, the body having a diameter that just fits inside the instrument well.

15. The apparatus of claim 14 wherein the well pipe has a pair of aligned opposed holes near the bottom thereof, and the base has a pair of aligned opposed bores therethrough, such that when the base is raised to a securable position, the bores will be aligned with the holes, and further comprising a securing pin that can then be pushed through the aligned holes and bores to hold base in place at the bottom of the well.

16. The apparatus of claim 1 further comprising a spring positioned around the stud to provide compression force when the stud is raised through the central bore and to hold the pin in contact with the support surface when resting thereon.

17. The apparatus of claim 1 further comprising a telescoping or segmented lifting tool that removeably engages a bottom of the pulley assembly for raising and lowering and turning the pulley assembly to engage and disengage the pin from resting on the support surface.

18. A method of removeably mounting a pulley assembly from a bottom in an inverted well where there is limited access to a top of the well, the pulley assembly comprising a pulley and an axle on which the pulley is mounted, comprising:

fixedly mounting a receptacle at the top of the well during construction thereof, the receptacle defining therethrough a central bore and a pair of opposed slots extending from the central bore, and having a support surface surrounding in part the central bore and slots, with the support surface in a substantially horizontal orientation and the central bore and slots in a substantially vertical orientation;

providing a stud assembly comprising a vertical stud and an engagement pin extending orthogonally to the stud, with the pulley assembly attached to and below the stud assembly, the pulley assembly being sized to substantially a well pipe diameter, the axle being substantially orthogonal to the stud;

engaging the bottom of the pulley assembly with a lifting tool;

lifting the tool so that the stud is removably inserted into the central bore and raised such that the pin passes through the slots, and then rotating the tool so that the stud is then rotated such that the pin rests on the support surface, to install the pulley assembly in an operable orientation at the top of the well;

lifting the tool so that the pin is raised from the support surface, then rotating the tool so that the pin is positioned over the slots, then lowering the tool so that the stud slides down the central bore and the pin passes down through the slots, to remove the pulley assembly from the top of the well.

19. The method of claim 18 wherein the tool is a telescoping tool or is assembled and disassembled in segments.

\* \* \* \* \*